(12) United States Patent
De La Corte

(10) Patent No.: US 11,034,406 B2
(45) Date of Patent: Jun. 15, 2021

(54) STRUCTURAL ELEMENT OF A CYCLE PROVIDED WITH A VIBRATION DAMPING DEVICE AND METHOD FOR MANUFACTURING SUCH AN ELEMENT

(71) Applicant: TIME SPORT INTERNATIONAL, Voreppe (FR)

(72) Inventor: Tony De La Corte, La Murette (FR)

(73) Assignee: CARDINAL CYCLING GROUP, Little Rock, AR (US)

( * ) Notice: Subject to any disclaimer, the term of this patent is extended or adjusted under 35 U.S.C. 154(b) by 306 days.

(21) Appl. No.: 16/227,707

(22) Filed: Dec. 20, 2018

(65) Prior Publication Data

US 2019/0185102 A1  Jun. 20, 2019

(30) Foreign Application Priority Data

Dec. 20, 2017  (FR) ...................................... 1771397

(51) Int. Cl.
| | | |
|---|---|---|
| *B62K 21/02* | (2006.01) | |
| *B29D 12/00* | (2006.01) | |
| *B62K 19/16* | (2006.01) | |
| *B62K 19/30* | (2006.01) | |
| *F16F 7/104* | (2006.01) | |
| *B62K 25/02* | (2006.01) | |
| *B29K 307/04* | (2006.01) | |

(52) U.S. Cl.
CPC .............. *B62K 21/02* (2013.01); *B29D 12/00* (2013.01); *B62K 19/16* (2013.01); *B62K 19/30* (2013.01); *B62K 25/02* (2013.01); *F16F 7/104* (2013.01); *B29K 2307/04* (2013.01); *B62K 2201/06* (2013.01)

(58) Field of Classification Search
CPC .......... B62K 21/02; B62K 25/08; F16F 7/104
USPC ........................................ 280/279, 276, 283
See application file for complete search history.

(56) References Cited

U.S. PATENT DOCUMENTS

| | | | | |
|---|---|---|---|---|
| 5,016,895 A | * | 5/1991 | Hollingsworth ....... | B62K 21/02 264/258 |
| 5,080,384 A | * | 1/1992 | Groendal ............... | B62K 19/02 280/275 |
| 5,193,832 A | | 3/1993 | Wilson et al. | |

(Continued)

FOREIGN PATENT DOCUMENTS

| | | | | |
|---|---|---|---|---|
| DE | 202013100502 U1 | * | 2/2013 | ............. B62K 25/04 |
| DE | 102015203640 A1 | * | 9/2016 | ............. B62K 21/02 |

(Continued)

OTHER PUBLICATIONS

English Translation of Description (FR 3052433) Obtained from Google Patent (Year: 2020).*

Primary Examiner — Ruth Ilan
Assistant Examiner — Myles A Harris
(74) Attorney, Agent, or Firm — Buchanan Ingersoll & Rooney PC

(57) ABSTRACT

A structural element of a cycle includes at least one tubular sheath provided with an outer wall delimiting, with an inner partition, at least one cavity in which a vibration damping system is accommodated. The sheath includes at least two internal cavities, each delimited between the inner partition and the outer wall, one of the internal cavities forming a housing in which the damping system is accommodated and attached.

20 Claims, 4 Drawing Sheets

(56) References Cited

U.S. PATENT DOCUMENTS

| | | | | |
|---|---|---|---|---|
| 5,752,711 A * | 5/1998 | Moreau | ............... | B62J 1/04 |
| | | | | 280/276 |
| 5,836,213 A * | 11/1998 | Hopey | ............... | B62K 21/08 |
| | | | | 74/551.2 |
| 5,915,675 A * | 6/1999 | Chen | ............... | B62J 1/04 |
| | | | | 267/132 |
| 6,109,637 A * | 8/2000 | Kirk | ............... | B62K 25/04 |
| | | | | 267/153 |
| 6,145,637 A * | 11/2000 | Hopey | ............... | B62K 21/08 |
| | | | | 188/306 |
| 6,397,988 B1 * | 6/2002 | Ptak | ............... | F16F 1/505 |
| | | | | 174/42 |
| 6,416,068 B2 * | 7/2002 | Makino | ............... | B62K 25/16 |
| | | | | 280/124.1 |
| 6,427,988 B1 * | 8/2002 | Li | ............... | B62K 25/04 |
| | | | | 267/140.11 |
| 6,431,574 B1 | 8/2002 | Gueugneaud | | |
| 6,837,507 B1 * | 1/2005 | McJunkin | ............... | B62J 1/06 |
| | | | | 280/276 |
| 7,390,004 B2 * | 6/2008 | Gogo | ............... | B62K 21/08 |
| | | | | 188/290 |
| 8,430,416 B2 * | 4/2013 | Battlogg | ............... | F16F 9/34 |
| | | | | 280/284 |
| 9,580,130 B2 * | 2/2017 | Perkins | ............... | B62K 3/02 |
| 2004/0007848 A1 * | 1/2004 | Sinyard | ............... | B62K 25/04 |
| | | | | 280/279 |
| 2007/0272451 A1 * | 11/2007 | Cauwet | ............... | B62K 21/08 |
| | | | | 180/6.24 |
| 2015/0251721 A1 * | 9/2015 | Chubbuck | ............... | B62K 25/04 |
| | | | | 280/276 |

FOREIGN PATENT DOCUMENTS

| | | | | |
|---|---|---|---|---|
| EP | 1 015 301 A1 | 7/2000 | | |
| EP | 2060481 A1 * | 5/2009 | ............ | F16F 7/104 |
| FR | 2 684 062 A1 | 5/1993 | | |
| FR | 2 923 449 A1 | 5/2009 | | |
| GB | 487095 A * | 6/1938 | ............ | B62K 25/08 |
| WO | WO-9114882 A2 * | 10/1991 | ............ | F16F 7/1022 |
| WO | 99/15395 A1 | 4/1999 | | |
| WO | 2017/209606 A1 | 12/2017 | | |

* cited by examiner

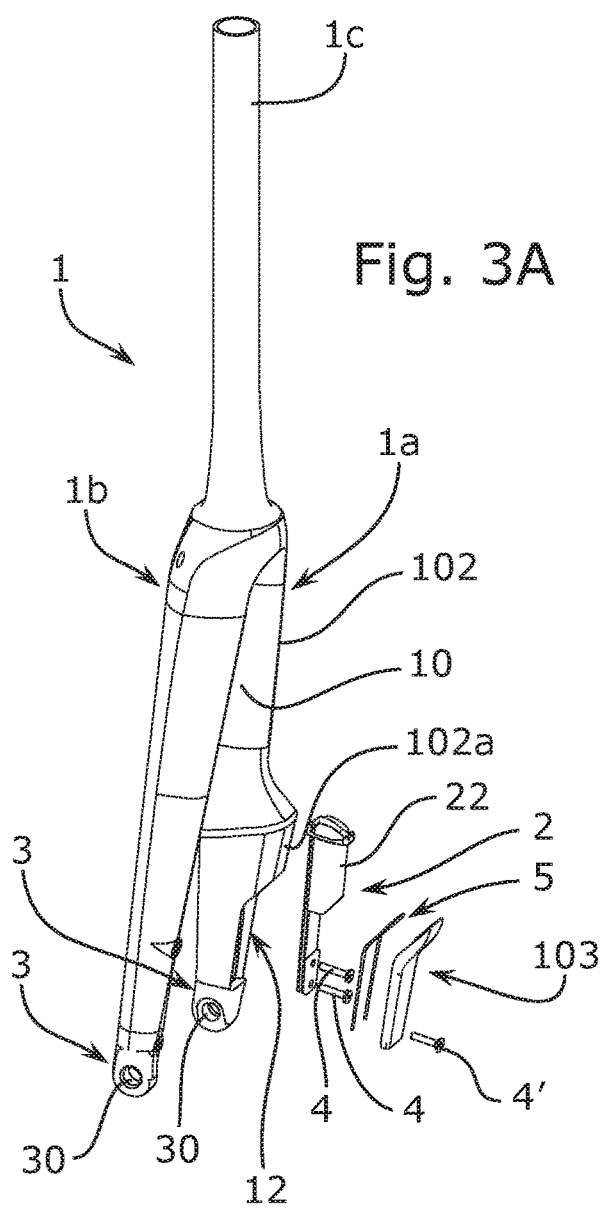
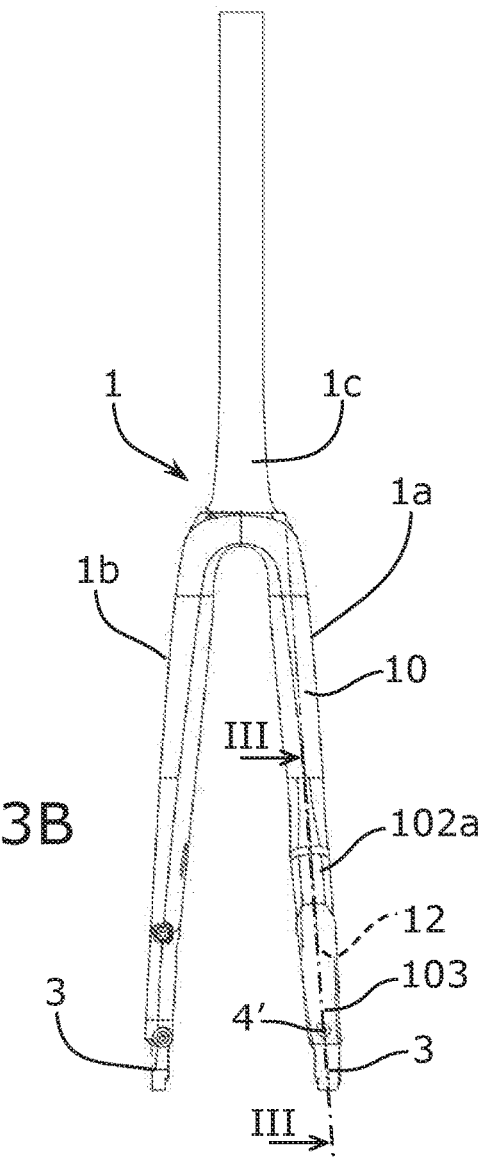
Fig. 3A
Fig. 3B

STRUCTURAL ELEMENT OF A CYCLE PROVIDED WITH A VIBRATION DAMPING DEVICE AND METHOD FOR MANUFACTURING SUCH AN ELEMENT

CROSS-REFERENCE TO RELATED APPLICATION

This application claims priority to French Patent Application No. 1771397 filed on Dec. 20, 2017, the entire contents of which are incorporated herein by reference.

The disclosure relates to a structural element of a bicycle equipped with a vibration damping device, for example, a possibly removable dynamic resonator. It also relates to a cycle, in other words a bike, a bicycle, a tricycle or monocycle, made with such structural elements and a method for integrating the vibration damping device into said structural element.

More specifically, the disclosure relates to the improvement of a structural element such as a bicycle fork or frame enabling the integration of at least one damping device, such as a dynamic resonator, which may be removable and interchangeable.

BACKGROUND

Bicycle or bicycle wheels are subject to vibrations that originate from the more or less irregular surface condition of the road or track. In addition to the fact that these vibrations generate joint micro-traumas, they also degrade the road-holding of the cycle, affect the control and handling of the trajectory and therefore affect the comfort, safety and performance of the cyclist. In addition, these vibrations can damage or accelerate the wear of certain components of the cycle.

In the presence of such vibrations, which generally fall within a frequency range of 20 to 50 Hz, a vibration amplification effect associated with resonance phenomena occurs. This effect tends to spread, via the fork, throughout the cycle structure, from the grip to the handlebar, the curved part of the handlebar and can reach the saddle.

The wheels that are in direct contact with the road surface, as well as the tires they are equipped with, could be optimized as a priority to limit the transmission of vibrations to the cycle frame. However, bicycle frames manufacturers that do not have control over the choice of wheels or tyres by the user have therefore opted for bicycle design and, in particular, for frames that make it possible to weigh their vibration behaviour as effectively as possible.

Thus, the structure of the cycles has been equipped with various damping systems and in particular with "dynamic resonators", which are "mass-spring" type devices designed to vibrate by filtering vibration peaks harmful to the mechanical behaviour and kinematic efficiency of the cycle.

In particular, by treating vibrations at the fork of the cycle, i.e. as close as possible to the wheel and therefore to the tread, these vibratory phenomena can be significantly reduced and their propagation to other parts of the cycle and to the cyclist avoided.

In this context, the document FR 2 923 449 discloses a device for filtering and absorbing vibratory energy, or resonator, comprising at least one blade with a first free end and possibly carrying a flyweight and the second end being attached to a component of the bicycle, for example, inside at least one of the fork arms and, preferably, in its area of connection with the wheel.

This blade is made of a first substantially rigid material and is attached to at least one strip made of a second substantially elastic material. The vibrations which the wheel is subjected to are transmitted to the blade, via the connection area with the fork, in the form of oscillations.

As a result, the strip in contact with the blade is subjected to tangential forces from the oscillations of the blade that cause shear deformation and therefore dissipation of vibration energy.

At the same time, efforts have been made to reduce the weight of bicycle components without reducing their mechanical strength, by using composite materials that are lighter than traditional metal alloys. This is the case, in particular, for the bicycle fork, both arms of which are made of symmetrical sheaths at the base of which lugs are provided for connection with the axis of the front wheel.

Such composite material forks have been made by moulding, as described, in particular, in the patents FR 2 684 062 and EP 1 015 301. Moulding is carried out on a preform, having a fork-shaped cavity, with a composite material generally comprising layers of carbon fibre and resin. After stripping from the mould, the ends of the sheaths, at least partially hollow, sheaths are cut to introduce therein inserts forming the lugs for connection with the wheel, which are then glued to the sheaths.

Integrating a vibration damping or filtration device into a composite fork is also known. In such an embodiment, at least one of the two fork arms contains a resonator with a flexible blade carrying a flyweight at its free end and attached by gluing at the other end to the inner wall of the sheath.

Some forks incorporate more conventional damping systems, as in the document WO 2017/209606, which describes a front fork for mopeds. This fork consists of a sheath wherein a central cavity receiving a damping system and an upper cavity delimited by a transverse inner partition are provided. But none of these cavities is configured to form a housing that gives access to the damping system from the outside.

The document U.S. Pat. No. 5,193,832 describes a similar fork in which the sheath contains a central sleeve receiving the damping system.

However, known integration solutions are not satisfactory because they do not make it possible, on the one hand, to integrate a large damping device into the hollow space of a conventional fork without affecting its mechanical strength and, on the other hand, to replace the damping device in the presence, for example, of a deficient or defective resonator, without it being necessary to completely change the fork, which is economically disadvantageous.

SUMMARY

The purpose of this disclosure is to solve the technical problems raised by the prior art by modifying a structural element of a cycle or bicycle to integrate therein a vibration damping system without compromising either the mechanical strength of the structure or the efficiency of filtration and vibration absorption.

Another purpose of the disclosure is to provide a cycle or bicycle structural element making it possible to removably mount a vibration damping system and in particular a removable dynamic resonator.

Another purpose of the disclosure is to provide for a method for achieving optimal integration, in any part of the cycle structure, of a removable resonator by allowing its replacement in the event of wear or malfunction and without inducing a deterioration in the functional capabilities of the cycle structure.

The first goal is achieved according to the disclosure by means of a structural element of a cycle comprising at least one sheath provided with an outer wall delimiting, with an inner partition, at least one cavity in which a vibration damping system is accommodated, characterized in that said sheath comprises at least two internal cavities each delimited between said inner partition and the outer wall, one of said internal cavities forming a housing in which said damping system is accommodated and attached.

An advantageous characteristic is that the inner partition forms an inner extension of the outer wall.

Preferably, the inner partition has a downwardly inclined portion towards the outer wall, below its junction with the outer wall.

According to a first advantageous alternative embodiment, the internal cavities are each delimited between said inner partition and, respectively, the front outer wall and the rear outer wall.

In this case, the internal cavity forming a housing is preferably located between the inner partition and the rear outer wall.

In a second advantageous alternative embodiment, the internal cavities are each delimited between said inner partition and, respectively, the right outer wall and the left outer wall.

According to another advantageous characteristic, the inner partition contributes to the mechanical strength of the sheath in cooperation with the outer wall located on the side opposite the cavity.

According to another advantageous characteristic, said damping system is a dynamic resonator removably attached in one of said internal cavities.

According to a first alternative embodiment of the damping system, the resonator has a flexible blade with one end attached and the other end free and carries a flyweight.

Preferably, the flyweight is equipped with an elastomer lining.

According to another characteristic, the tubular sheath is closed by an insert on which the damping system is attached.

This damping system is attached to the insert, for example, by means of screws.

Another advantageous characteristic is that the internal cavity of the housing has an opening closed by a removable cover.

According to a preferred embodiment, the structural element of the disclosure is made of a composite material comprising carbon fibers embedded in a resin.

According to yet another characteristic, the damping system extends into the internal cavity substantially parallel to the axis of the sheath.

According to another specific characteristic, the internal cavity has a protruding portion forming a boss on the outer wall.

Another object of the disclosure is a bicycle fork comprising two arm-forming sheaths, at least one of which consists of a structural element as defined above.

According to a first alternative embodiment of this fork, only one of its two arms receives a damping system, for example as a dynamic resonator in the internal cavity and this dynamic resonator has a mass exceeding 100 g.

According to another alternative embodiment of this fork, its two arms each receive a dynamic damping system in the cavity and each damping system has a mass of less than 100 g.

Yet another object of the disclosure is a bicycle comprising, in particular, a fork as defined above and a front wheel equipped with either a disc brake system or a block brake system.

A final object of the disclosure is a method for making a structural element for a cycle made of a composite material comprising at least one tubular sheath and an internal cavity opening to the outside, characterized in that the preforms of at least two fusible wax cavities are made, each of the preforms is coated with a carbon fibre covering and then said preforms are juxtaposed and wrapped with a common coating of carbon fibre to form a solid unit, the unit is positioned in a mould wherein resin is injected under pressure with heating and then, after melting and evacuating the molten wax, the hollow sheath thus obtained is stripped from the mould, one of the two cavities is opened by cutting out its outer wall and the end of the sheath is sealed by gluing an insert.

According to a characteristic of the method, a dynamic damping system such as a resonator is placed in the open internal cavity, the resonator is screwed to the insert and then an attached cover is removably assembled to close the cavity.

Thanks to the improvement of the disclosure, the filtration system, such as a dynamic vibration-filtering resonator, can easily be replaced in case of defect or wear and/or exchanged with another resonator to optimize the vibration filtration capacities and adapt them to road conditions and travel and pedalling conditions (speed, comfort, performance, etc.).

The accessible and interchangeable nature of the dynamic drum filtration system makes it possible to select, in particular, a blade length, the stiffness of this blade and an appropriate mass.

The dynamic resonator could also be made by combining a spring and a flyweight without leaving the scope of the disclosure.

In addition, the interchangeable resonator structural element of the disclosure is made by moulding a composite material and can thus take a specific profile allowing it to be integrated into any part of the bicycle.

In particular, the method of the disclosure can give the shape and dimensions specific to a given structural element and which require specific functions, such as the fork, the frame or the saddle stem, etc., while providing it with an internal cavity in which an interchangeable resonator may be mounted.

Thus, thanks to these characteristics, an asymmetric filter fork made of composite material the profile of which is suitable for mounting on a wheel equipped with a disc brake and the mechanical properties of which are preserved.

BRIEF DESCRIPTION OF THE FIGURES

Further characteristics and advantages of the disclosure will emerge from the following description, with reference to the figures annexed and detailed below.

FIGS. 3A and 3B are views, respectively, of the exploded perspective and the rear of one embodiment of a fork with a removable resonator according to the disclosure.

For greater clarity, identical or similar elements are identified by identical reference signs on all figures.

DETAILED DESCRIPTION OF EMBODIMENTS

Of course, the embodiments illustrated by the figures presented above and described below are given only as non-exhaustive examples. It is explicitly provided that these various embodiments can be combined to propose other ones.

Figure 1:
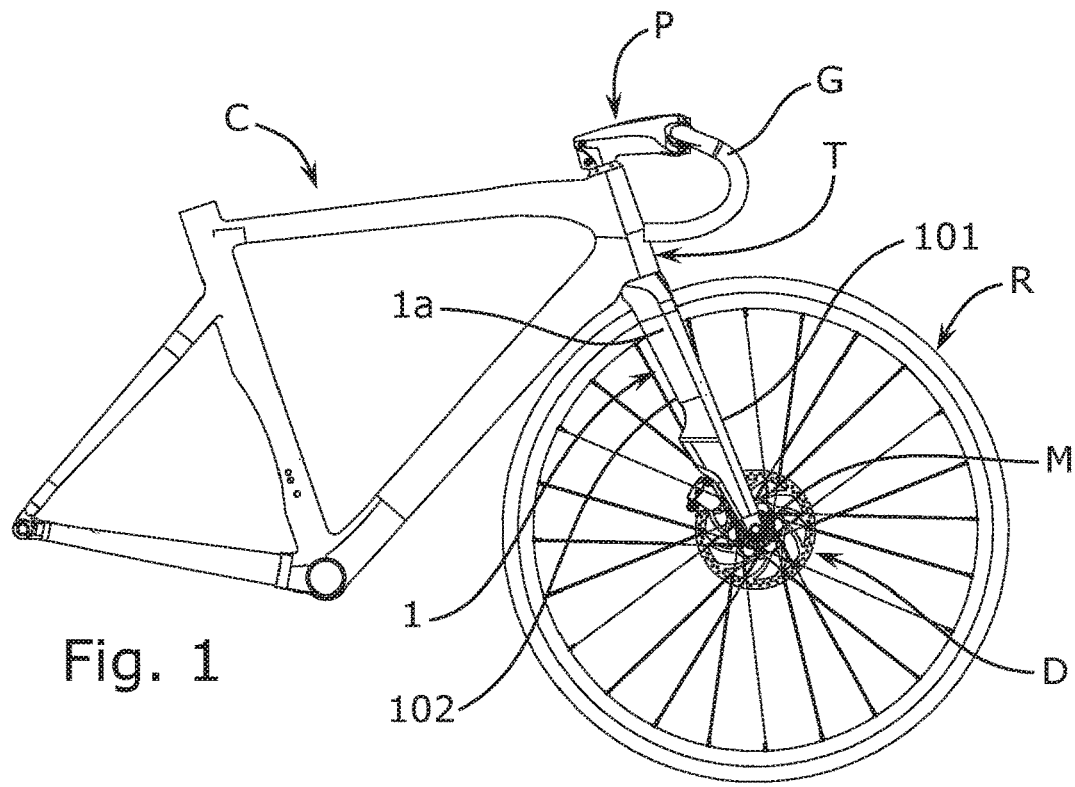
FIG. 1 shows a partial profile view of a bicycle equipped with a fork embodiment according to the disclosure.

FIG. 1 shows a partial bicycle structure (without the rear wheel) with a one-piece frame C connected to a fork 1 connecting the front wheel R to a handlebar G supporting grip P.

The fork 1 comprises two substantially vertical arms $1a$, $1b$ on each side of the wheel R and the lower ends of which are connected to the axle and the hub M of the wheel R which is equipped here with a disc brake D (shown here behind the wheel). The disc D is offset parallel to the plane of the wheel R.

The fork 1 is equipped with a dynamic resonator 2 which is visible here in profile and which is attached on the lower part of at least one of the two fork arms, and here the arm $1a$. This dynamic resonator is of the "mass-spring" type and in the embodiment illustrated, the spring is a spring blade. In the particular case of a bicycle equipped with a disc brake on the front wheel, the resonator 2 is positioned inside the fork leg $1a$, on the fork side where the brake disc D is not mounted. This resonator, which is known per se, is then described in detail with reference to FIGS. 2 and 3A.

As a matter of fact, in order to dissipate the vibration peaks harmful to the mechanical behaviour and kinematic efficiency of the cycle, it is known to equip certain elements of the bicycle structure with devices, called dynamic resonators, intended to vibrate to absorb the vibrations and stop the propagation thereof. The choice of the spring or the spring blade stiffness and the weight of the flyweight makes it possible to adjust the resonator to the frequency to be damped, in a known way.

In particular, by treating vibrations at the fork, i. e. as close as possible to the wheel and therefore to the tread, it is possible to significantly reduce these vibration phenomena.

However, it is possible to further improve the treatment of vibrations by equipping the bicycle with dynamic resonators integrated into other structural elements such as the frame C, the saddle stem, the grip P, the handlebar G, and used alone or in combination with each other or in combination with the dynamic resonator mounted in the fork 1.

Figure 2:
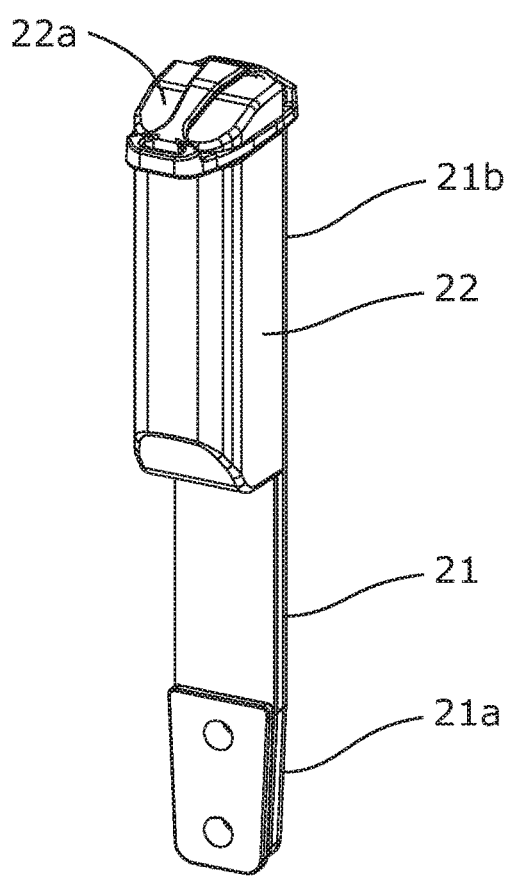
FIG. 2 shows a perspective view of an embodiment of a dynamic resonator used within the scope of the disclosure.

As illustrated in FIG. 2, the resonator includes a, for example metallic (e.g. made of stainless steel, titanium, etc.) flexible blade 21. This flexible blade 21 is preferably composed of several layers and, for example, an elastomer layer interposed between two metal layers to enable vibration damping by energy dissipation during shearing created inside the elastomer layer. Thus, the resonator used is then of the Mass-Spring-Damper type.

The end of this blade 21 and, preferably, the lower end $21a$ is attached to a structural element of the cycle such as the fork 1. The other (upper) end $21b$ of the blade 21 is free and carries a flyweight 22 (e.g. made of a brass-based metal alloy), which is lined here with a cap $22a$ made of elastomeric material.

FIG. 3 represents a structural element consisting here of a fork 1 comprising two arms $1a$, $1b$ each consisting of a tubular sheath 10. The two sheaths 10 meet at the top to form a single tube $1c$ which forms a support for the head tube T of the frame as well as the grip P which connects the fork to the handlebar G. The tubular sheath 10 or hollow tube can have cross-sections of various, i.e. oval, circular or even polygonal shapes. It has an elongate shape and evolving and/or constant sections along its length.

In order to lighten the structure of the cycle, the outer wall of the sheath 10 is made by moulding a suitable rigid composite material (carbon and/or glass fibres and resin) obtained by a known method or by the particular method described in detail below. However, it will not be possible to leave the scope of the disclosure if the sheath is made of another material such as aluminium or steel.

According to the disclosure and as illustrated in FIGS. 4A, 4B, 4C and 5 representing longitudinal and transverse sections of the arm $1a$ of the fork 1, the sheath 10 has an inner partition 100 delimiting at least two internal cavities with the outer wall of the sheath 101, 102.

A first cavity 12 is located on the rear side and is delimited between the inner partition 100 and a portion of the outer wall 102 facing the rear of the bicycle. A second internal cavity 11 is located on the front side of the fork 1 and is delimited between the inner partition 100 and the outer wall 101 facing the front of the bicycle (after mounting the fork 1).

The wall 102 is subsequently referred to as the rear outer wall because it faces the rear of the cycle, as opposed to the front outer wall 101 which faces the front (see FIGS. 3A and 4A).

The inner partition 100 is preferably made of a material of the same family as the outer wall 101, 102. For example, in the case where the outer wall is made of composite material, the inner partition will also be made of composite material. It will not be possible to leave the scope of the disclosure if the inner partition 100 is positioned so that the two internal cavities 11, 12 are located one to the right and the other to the left of the fork 1.

The internal cavity 11 delimited by the front outer wall 101 and the inner partition 100 is empty and has continuous and regular surfaces contributing to the mechanical strength of the sheath 10 and therefore of the fork 1. This internal cavity 11 extends to the top of the sheath and even into the top tube $1c$ of the fork. The mechanical strength of the fork 1 is regulated by the selected materials of the walls of the cavities 11 and 12, the thickness of these walls and the orientation of the fibres. In particular, the thicknesses of the wall 101 and the inner partition 100 limiting the empty cavity 11 are substantially similar, and greater than the thickness of outer wall $102a$ limiting the cavity 12 receiving the damping device.

If necessary, the internal cavity 11 may be filled with a light material (such as polyurethane foam, cellular material, expanded polystyrene, etc.) and divided into cells or combined with other internal cavities or sub-cavities, separated by partitions with different (transverse, vertical, inclined, etc.) orientations.

Figure 5:
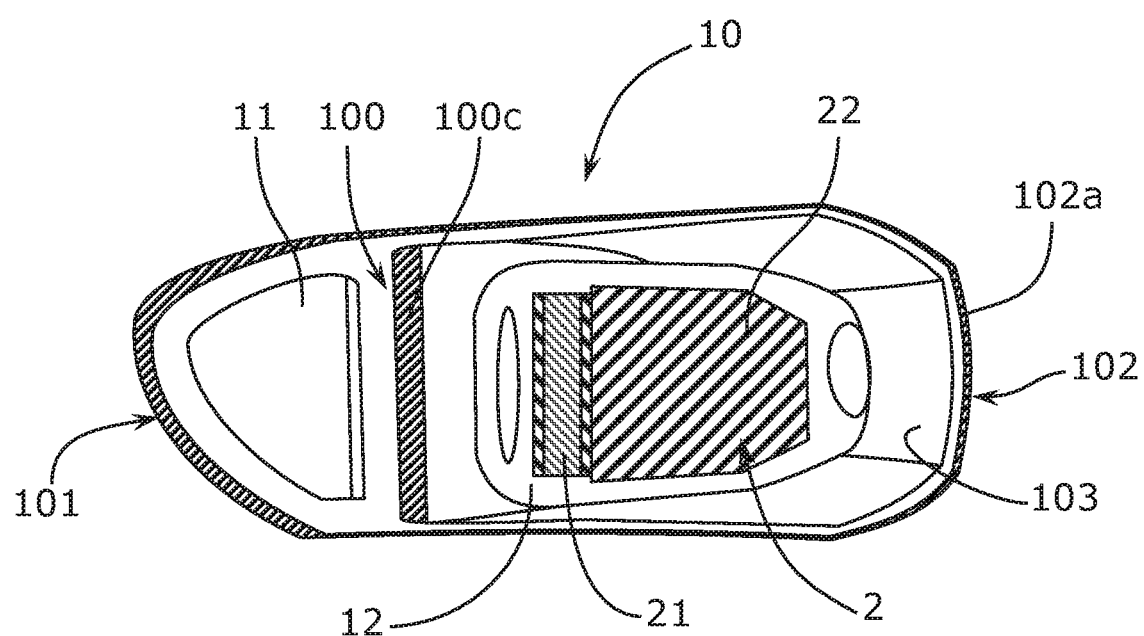
FIG. 5 shows a cross-sectional view according to plane IV-IV of one of the fork arms as partially shown in FIG. 4B.

In addition, the cavity 12 delimited by the outer wall 102 and the inner partition 100 forms a housing intended to receive the dynamic resonator 2. This dynamic resonator 2 is preferably attached removably and interchangeably in the cavity 12. The sheath 10 or the fork according to the disclosure also presents a protrusion forming a boss on one of its faces. This boss is located in the area of the sheath with the two internal cavities 11, 12, as shown in FIG. 5.

However, the disclosure is not limited to the presence of the damping system 2 in the cavity 12 located at the rear of the fork 1. As a matter of fact, within the scope of the disclosure, the damping system 2 can be positioned in an internal cavity created at any location of the sheath, in particular, in the cavity 11 located at the front or in another cavity located on the left or right side of the fork 1.

Preferably, and as shown in the figures, the inner partition 100 does not extend here over the entire height of the sheath 10 or the entire height of the fork arm 1 but extends locally over only part of the height thereof. The inner partition substantially extends in the longitudinal direction of the sheath 10 or the fork arm 1. It is connected, at its upper end, to the rear outer wall 102, moves away from it towards the other outer wall 101 and then returns to the same outer wall 102 to which it is again connected, at its lower end, so as not to impede the internal cavity 11. In the section plane of FIG. 5, the internal cavity 11 has a smaller cross-section than the internal cavity 12.

Due to the presence of the internal cavity 12, the function of the inner partition 100 is to ensure, at least partially, the mechanical strength of the sheath in cooperation with the outer wall portion 101 located on the side opposite the cavity 12, i. e. the one that delimits the cavity 11 by facing towards the front of the bicycle after assembly of the fork 1 on the wheel R. To this end, the inner partition 100 forms an internal extension of the rear outer wall 102.

The rear outer wall 102 has an opening communicating with the internal cavity 12 which is closed by a cover or a hatch 103. The hatch 103 carries removable attaching (e.g. screwing or snap-on) members cooperating with complementary members on the outer wall 102 around the cavity 12. The cover 103 may be equipped with a seal 5 (FIG. 3). This cover 103 is made of a plastic, or metallic or composite material and, if necessary, with a transparent plastic material making it possible to see the resonator 2.

According to an alternative embodiment, not shown, the cover 103 is secured to the outer wall 102, either by being permanently or removably glued, for example by means of a hot melt adhesive, or by being movably connected by hinges attached to the edge of the cavity 12.

Figure 4A:
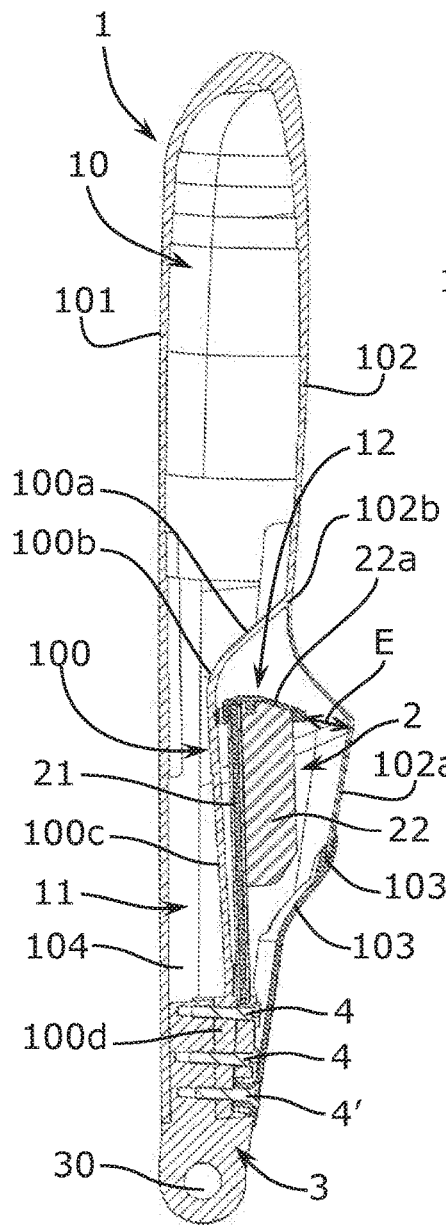
FIGS. 4A, 4B and 4C show partial views in vertical section according to the median plane III-III of one of the fork arms in FIG. 3B, in various resonator positions.

In the embodiment illustrated in FIGS. 3 and 4A, the cover 103 is positioned in the lower part 102a of the outer wall 102, in the area of the cavity 12, and is attached, in its lower part, by means of a screw 4' engaged in a threaded hole in the insert 3. In another embodiment, not shown, the cover could also be positioned higher on the fork 1, still in the area of the cavity 12.

The upper edge of the cover 103 has a groove 103a into which the lower edge of the outer wall 102 is inserted and wedged in the closed position of the cavity 12.

In another embodiment, not shown, the cover could also be positioned higher on the fork 1, still in the area of the cavity 12.

According to an alternative embodiment, not shown, the resonator is accommodated in an independent and removable housing which is added and attached in an internal cavity previously made in the sheath.

The tubular sheath 10 is hollow and is closed at the bottom by a preferably metallic (aluminium, . . . ) insert 3, or made of composite material that takes up the forces transmitted by the wheel. This insert 3 is provided with an orifice 30 intended to receive the axis of the front wheel R and on this insert 3 is attached the lower end 21a of the resonator 2, i. e. the lower end of the blade spring 21. The resonator 2 is attached here by means of two screws 4 mounted in threaded holes of the insert 3 above that of the cover 103 fixing screw 4'.

Figure 4B:
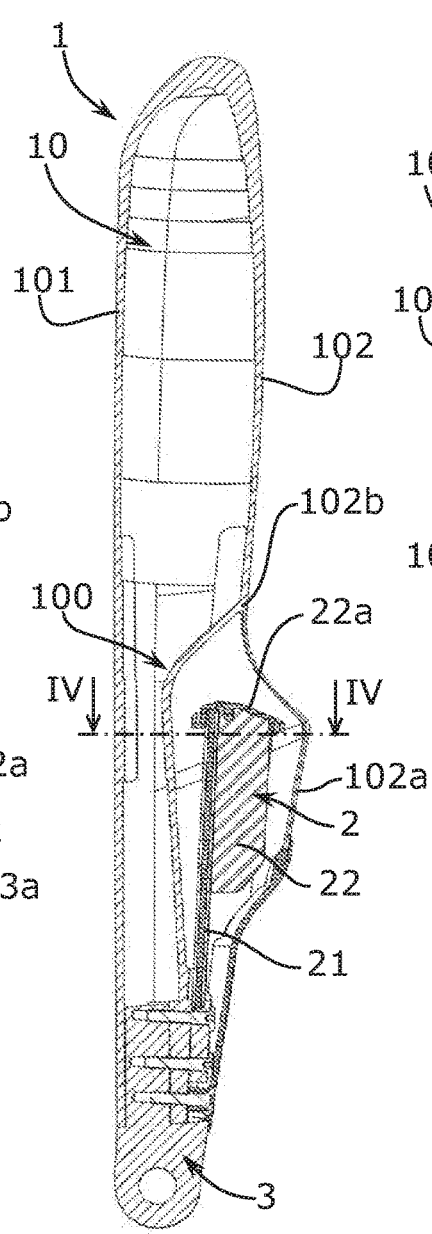
Figure 4C:
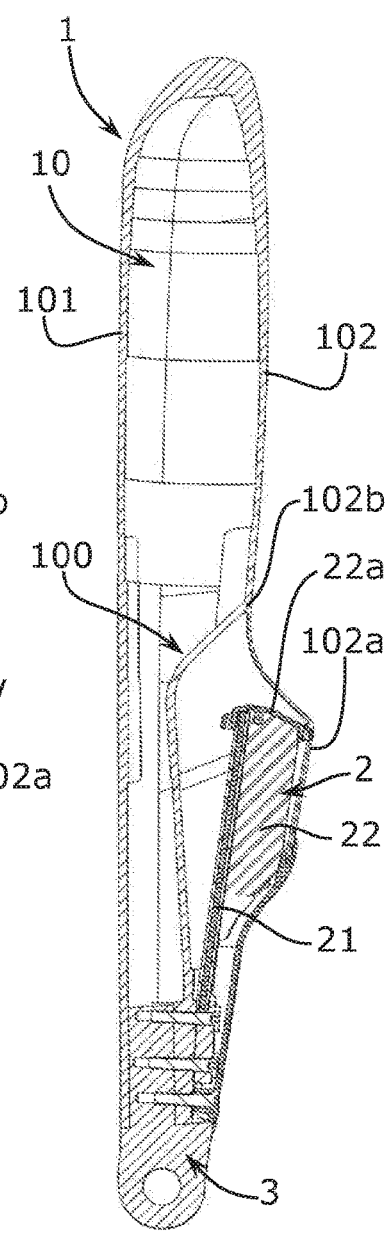

As illustrated, in particular, by FIGS. 4A to 4C, the thickness of the outer wall 101, 102 delimiting the sheath 10 is variable over the height of the fork 1 and is generally between 0.5 mm and 3 mm.

The front outer wall 101 extends substantially continuously from top to bottom while the rear outer wall 102 has an inflection zone of 102b at the connection to the internal partition 100. This inflection zone is extended by a protrusion 102a delimiting an enlarged area at the top of the cavity 12 so as to provide sufficient space for the introduction and the subsequent travel of the resonator 2, as described later in FIGS. 4A to 4C. Thus the cavity 12 has a volume greater than the volume of cavity 11, with this volume being considered over the distance in height occupied by the resonator.

The inner partition 100, on the other hand, has a substantially uniform thickness of about 1 mm and has, below its junction with the rear outer wall 102, a portion 100a inclined forward and downwardly towards the front outer wall 101. The inclination of the portion 100a is approximately 35° to 45° with respect to the vertical axis of the sheath 10. The inclined portion 100a delimits, in the upper part of the cavity 12, an enlarged zone, complementary and symmetrical to that delimited by the protrusion 102a of the rear outer wall 102.

The inclined zone 100a extends, approaching the front outer wall 101, in an angled sinking 100b which is located at a distance of at least 8 mm from the front outer wall 101, to ensure the resistance of the fork to bending forces in particular. Due to the presence of this angled sinking 100b, the cavity 11 not receiving the resonator is narrow and, in particular, narrower in this section than the cavity 12 receiving the resonator 2, as shown in FIGS. 4A to 4C.

Below the angled sinking 100b, the inner partition 100 has a slightly inclined portion 100c which deviates rearward and downwardly towards the rear outer wall 102 by an angle of about 5° from the vertical axis of the sheath 10 and delimits, with the front outer wall 101, a flared duct 104 in the lower part of the fork arm 1.

With the configuration described above and as shown in cross-section, in particular in FIG. 4A, portions 100a, 100b and 100c of the inner partition 100 provide an inner arching which participates in the rigidity and mechanical strength of the sheath 10. This arching is necessary to compensate for the weakening of the rear outer wall 102, which is thinned above the cavity 12 and interrupted in the lower part by its through opening.

In order to further strengthen the rigidity of the sheath 10, the lower edge 100d of the inner partition 100 is here trapped and screwed between the lower end of the resonator 2 and the insert 3, as shown in cross-section in FIG. 4A.

At the lower end of the sheath 10, the two internal cavities 11, 12 open to the outside at the same level, before the insert 3 is mounted.

The vibrations from the wheel R are transmitted, via the insert 3, to the resonator 2, which starts to oscillate and thus reduces the amplitude of the vibration peaks. The oscillations of the resonator 2 result in flexions of the blade 21 and rapid deflections of its upper end carrying the flyweight 22 in the cavity 12 between two end stop positions represented by FIGS. 4A and 4C respectively. The extreme forward position of the resonator (FIG. 4A) corresponds to a contact with the inner partition 100 at its bevelled portion 100d whereas the extreme rear position of the resonator 2 (FIG. 4C) corresponds to a contact with the rear outer wall 102 at the protrusion 102a thereof.

In the range of vibrations generally encountered, the oscillation amplitude of the resonator 2 is between 4° and 5° and attenuates frequencies between 30 and 36 Hz, preferably 33 Hz.

The level of frequency peak attenuation or vibration damping by the resonator 2 is between 20 and 30%.

When the front wheel of the bicycle is equipped with a disc brake, the fork arm on the disc side has a narrower profile that is not compatible with the integration of a resonator. Under these conditions, the resonator can only be mounted on the other arm and must provide the functions and vibration filtration capacity of two conventional resonators.

However, this objective requires a significant increase in the dimensions of the damping system, which raises issues as regards space, attaching inside the arm and, ultimately, the mechanical strength of the fork.

In this case, the damping device is configured and sized in such a way that it alone has sufficient filtration capacity to handle the vibrations transmitted to both arms and, in particular, it is then necessary to significantly increase the mass of the resonator. Good damping results have been obtained with a mass of the resonator greater than 100 g, for example, between 120 g and 180 g and preferably between 155 and 165 g, provided by a metal flyweight with a width between 15 and 20 mm.

Due to these large dimensions, the outer wall 102 of the sheath has a significant protrusion 102a forming a boss that extends over the entire length of the cavity 12 receiving the resonator. This protrusion 102a deviates from the plane formed by the outer wall 102 located above the cavity 12 by a transverse distance E greater than 15 mm. If the front wheel is equipped with a disc brake D requiring a thinner fork arm on the disc side, then the single resonator is mounted on the fork arm located on the side opposite the disc.

In addition, the structural element considered may be a fork where each of the two arms can be so designed as to have an internal cavity in which a dynamic resonator can be accommodated. This case occurs, in particular, if the wheel is equipped with a block brake allowing the mounting of a resonator in each arm. In this case, the mass of each resonator will be lower than in the version with a single resonator and will be less than 100 g, for example between 60 g and 100 g and, preferably, between 70 and 80 g.

As a result, the flyweight 22 will have a width between 5 and 15 mm, the outer wall 102 of the sheath having a protrusion 102a the transverse dimensions of which are smaller over the entire length of the cavity 12 receiving the resonator. This protrusion always forms a boss that deviates from the plane formed by the outer wall 102 located above the cavity, with a transverse distance E between 5 and 15 mm.

In the position shown in FIG. 4A, the flyweight 22 abuts against the inner partition 100. The shock of the flyweight against the partition 100 is damped by the elastomeric cap 22a which also reduces the noise of the impact.

In the position shown in FIG. 4C, the flyweight 22 then abuts against the outer wall 102. The shock of the flyweight against the projecting portion 102a of the wall 102 is also damped by the elastomeric cap 22a.

In FIG. 4B, the resonator 2 is in an intermediate position centered between the extreme positions of FIGS. 4A and 4C. This position also corresponds to its rest position in the absence of vibration. In this position, the resonator 2 extends, inside the cavity 12, substantially parallel to both the axis of the sheath 10 and the front outer wall 101 thereof.

To enable the resonator to operate properly, the cavity 12 therefore has a width that is 1.5 to 2 times the width of the resonator 2 and the cavity 12 has a width that is at least 2 times the width of the cavity 11 at the inflection line of the 100b angled sinking of the inner wall 100.

According to the disclosure, different methods for manufacturing composite forks may be used. The method for making the bicycle structural element described below is a preferred embodiment of the disclosure which is carried out as follows.

First a first cavity preform made of fusible wax and a second cavity preform also made of fusible wax are prepared. The preform of the first cavity is elongated in the shape of a sheath and opens out at both ends whereas the second cavity is shorter, in the shape of a closed housing.

Each of these preforms is coated with a carbon fibre covering. The two preforms are then juxtaposed and wrapped with a common covering of carbon fibres to form a solid unit. This common covering has the advantage of subsequently giving the fork good mechanical strength properties and coating it from top to bottom with a continuous layer of fibres.

The assembly is then placed in a heated mould and pressurized resin is injected into the mould to impregnate the carbon fibers. After melting and evacuating the molten wax, the hollow structural element is stripped from the mould carrying a closed cavity laterally which is cut out in its outer wall 102.

The opening thus made in the outer wall 102 must be sufficient to enable the resonator 2 to be introduced and passed through, in order to be placed in the cavity 2 and the attaching thereof on the sheath 10.

The next step consists in closing the lower end of the sheath 10 thus obtained by inserting and gluing a preferably metallic insert 3.

After attaching the dynamic resonator inside the cavity 12 on the insert 3 by means of screws 4 or by any other attaching means, the final operation consists in mounting the added (movable or removable) cover 103 to close the cavity 12, and secure it to the fork arm. If the resonator had to be replaced later, the cover 103 should be removed to access the cavity 12 and the resonator 2 should be dismounted.

In addition, since the cavity 12 is accessible from the outside due to the closing by a removable cover 103, it would also be possible to position and/or attach, in this cavity forming a housing (possibly in association with a damping system), other systems, such as sensors, anti-theft devices, or all types of useful accessories when using the cycle (maintenance means, . . . ) or personally belonging to the cyclist (mobile phone, keys, . . . ).

Positioning damping systems other than dynamic resonators inside the cavity 12, in particular shear energy dissipating damping systems that involve using elastomers, will not mean leaving the scope of the disclosure. As a conclusion, the following main advantages emerge from the disclosure:

The cycle or bicycle structural element, such as a frame element or a fork, is mechanically strong and has two cavities, one of which enables the possibly removable mounting of a functional element and, in particular, a vibration damping system, such as a dynamic resonator, for instance.

This damping system, and in particular the dynamic resonator, is accessible from the outside after disassembling a removable cover. This layout enables the user to choose the damping mode of the cycle according to its conditions of use (in lowland or in the mountains for example), its road conditions (smooth, rough, paved, . . . ) and the typology of the cyclist himself/herself, in particular his/her weight and/or his/her build. This provision also enables the user to change the resonator in case of failure or wear.

The invention claimed is:

1. A structural element of a cycle comprising at least one tubular sheath provided with outer walls delimiting, with an inner longitudinal partition, at least two internal cavities, each of the two internal cavities being delimited between said inner partition and the outer walls, one of said at least two internal cavities receiving a vibration damping system, wherein an outer wall of one of said at least two internal cavities forms a housing in which said damping system is accommodated and attached, and is provided with an opening communicating with said one of said at least two internal cavities configured to allow access to said damping system into said one of said at least two internal cavities.

2. A structural element according to claim 1, wherein the inner partition forms an inner extension of the outer walls.

3. A structural element according to claim 1, wherein the inner partition has a downwardly inclined portion below a junction of the inner partition with the outer walls.

4. A structural element according to claim 1, wherein said inner partition participates in the mechanical strength of the sheath in cooperation with one of the outer walls located on a side opposite said cavity forming the housing.

5. A structural element according to claim 1, wherein said damping system is a dynamic resonator removably attached in one of said internal cavities.

6. A structural element according to claim 5, wherein said resonator comprises a flexible blade, one end of which is stationary and an other end of which is free and carrying a flyweight.

7. A structural element according to claim 6, wherein said flyweight is provided with an elastomeric lining.

8. A structural element according to claim 1, wherein the tubular sheath is sealed by an insert to which said damping system is attached.

9. A cycle fork comprising two arm-forming sheaths, at least one of which consists of a structural element according to claim 1.

10. A cycle fork according to claim 9, wherein only one fork arm receives a dynamic damping system in the cavity forming the housing and wherein said damping system has a mass greater than 100 g.

11. A cycle fork according to claim 9, wherein the two fork arms each receive a dynamic damping system in the cavity forming the housing and wherein each damping system has a mass of less than 100 g.

12. A bicycle comprising a fork according to claim 9 and a braking system on a front wheel of the bicycle.

13. A bicycle according to claim 12, wherein said braking system is a disc brake mounted on the fork arm opposed to the fork arm receiving the damping system.

14. A bicycle comprising at least one structural element according to claim 1.

15. A structural element according to claim 1, wherein the outer wall of said one of said at least two internal cavities includes a protrusion forming a boss in an area of the sheath with the at least two internal cavities and delimiting an enlarged area at a top of said one of said at least two internal cavities configured to provide sufficient space for introduction and subsequent travel of said damping system.

16. A structural element according to claim 1, wherein said opening is closed by a removable cover.

17. A structural element according to claim 1, wherein said inner partition has an angled sinking with an inflection zone delimiting a portion of the sheath where said one of said at least two internal cavities forming the housing has a width that is at least 2 times a width of another one of said at least two internal cavities.

18. A structural element of a cycle comprising at least one tubular sheath delimited by an outer wall delimiting, with an inner partition, said at least one tubular sheath comprising at least two internal cavities including at least one cavity forming a housing in which a vibration damping system is accommodated and attached, wherein said at least two internal cavities are each delimited between said inner partition and, respectively, a front outer wall and a rear outer wall.

19. A structural element of a cycle according to claim 18, wherein the internal cavity forming the housing is located between the inner partition and the rear outer wall.

20. A structural element of a cycle comprising at least one tubular sheath delimited by an outer wall delimiting, with an inner partition, said at least one tubular sheath comprising at least two internal cavities including at least one cavity forming a housing in which a vibration damping system is accommodated and attached, wherein said at least two internal cavities are each delimited between said inner partition and, respectively, a right outer wall and a left outer wall.

* * * * *